Dec. 14, 1937. C. H. McINNIS 2,101,951
TROLLEY YOKE
Filed June 30, 1936
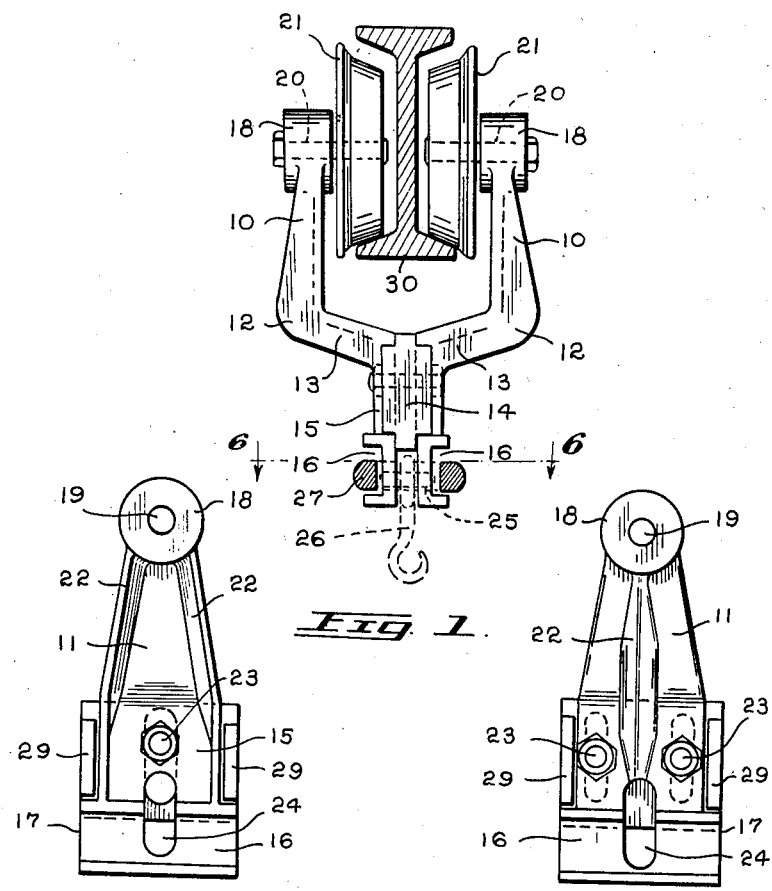
Fig. 1.
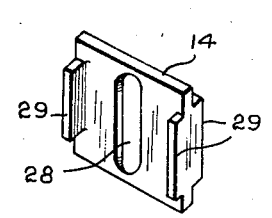
Fig. 2.
Fig. 3.
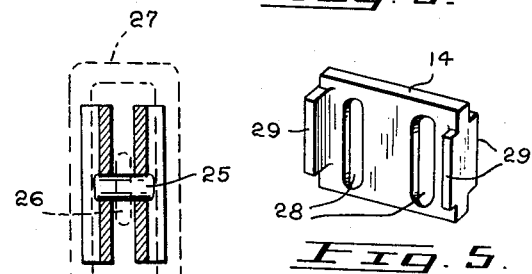
Fig. 4.
Fig. 6.
Fig. 5.
INVENTOR
Colin H. McInnis
By Ralph Burch
Attorney Patented Dec. 14, 1937

2,101,951

UNITED STATES PATENT OFFICE 2,101,951

TROLLEY YOKE

Colin Herbert McInnis, Windsor, Ontario, Canada

Application June 30, 1936, Serial No. 88,195

4 Claims. (Cl. 198—177)

This invention relates to improvements in a trolley yoke. Its primary object is to provide a trolley yoke to be associated with a conveyor chain having means to suspend the load carried thereby from the exact center of the said yoke and chain.

A further object of the invention is to devise a trolley yoke that may be readily attached to, or detached from, a link of a standard drop forge rivetless chain.

With these and other objects in view that may appear while the description proceeds, the invention consists in the novel construction and arrangement of parts as hereinafter more specifically set forth, claimed and shown in the accompanying drawing forming part of this application and in which:—

Fig. 1 is an end elevation of my improved trolley yoke showing the I beam support and chain in section.

Fig. 2 is a side elevation of one type of bracket forming part of the yoke.

Fig. 3 is a side elevation showing a modification of the said bracket.

Fig. 4 is a perspective view of an alignment keeper to correspond to the bracket shown in Fig. 2.

Fig. 5 is a perspective view of an alignment keeper to correspond to the bracket shown in Fig. 3.

Fig. 6 is a sectional view on the line 6—6 of Fig. 1.

Referring more in detail to the drawing in which similar reference characters designate corresponding parts throughout the several views it will be seen the invention comprises a pair of side arms or brackets 10, one being a duplicate of the other. The brackets include an arm 11 having an angular bend 12 therein. The lateral part 13 of the arm is designed to extend inward to a predetermined length so that when brackets are assembled together to form a yoke accommodation is provided for an alignment keeper or spacer 14. On the depending portion 15 of the bracket parallel projections are constructed to provide a lateral slot 16 therebetween, the ends 17 thereof extending slightly beyond the width of the arm. Said arm terminates in a circular boss 18 at its upper end which is provided with a circular orifice 19 to receive an axle 20 on which the trolley wheel 21 is rotatably mounted.

In Fig. 2 the arm is shown having two reinforcing webs 22 on the outer ends of the arm and a single bolt 23 therebetween by means of which the members are secured together when assembled.

In Fig. 3 an alternative construction is shown wherein a single reinforcing web 22 is constructed centrally of the arm while on either side thereof two bolts 23 are provided to secure the members together. Centrally positioned in the lower part of the arm is an elongated orifice 24 arranged to receive a support pin 25 on which a hook 26 or other similar means is pivotally mounted to support the load to be carried by the trolley. The pin is freely positioned between the two yoke arms and is retained therein by the link 27 of the conveyor chain which prevents excessive lateral movement thereto. The chain used is the standard drop forged rivetless chain in universal use. The lower ends of the two arms are inserted in one of the links so that the said link will engage the slot 16. The pin 25, the hook 26, and the alignment keeper 14 are then placed in position and the assembly secured by the bolt or bolts 23.

In Figs. 4 and 5 the alignment keepers are shown, the former having a centrally positioned elongated slot 28 to receive the bolt 23 while the latter has two such slots 28 to register with the bolt holes in the arm shown in Fig. 3. The keepers may be provided with square lugs 29 which fit snugly to the outer edge of the arm as shown and thereby secure the device when assembled in a manner to prevent any movement whatsoever so that the brackets are kept in true alignment with each other and the trolley wheels 21 are kept in alignment with the I beam support 30 or rail upon which they run.

It will be seen from the foregoing description that the load is supported from the exact center of the yoke thereby distributing the load evenly on each trolley wheel and consequently adding to the general efficiency of the device. The construction of the lower part of the arms to accommodate a standard chain link obviates the necessity of constructing a special link for this purpose and also simplifies the assembly of a conveyor chain inasmuch as the trolley yokes may be positioned or spaced on the chain where most advantageous, or readily moved should the necessity arise.

It is believed that the construction and advantages of the structure shown may be apparent from the foregoing paragraphs taken in conjunction with the accompanying drawing without further detailed description.

While the preferred embodiment of the invention has been disclosed it is understood that minor changes in the details of construction, combination and arrangement of cooperating elements may be resorted to within the scope of what is claimed without departing from the spirit of the invention.

I claim:—

1. A carrier trolley for conveyor chains including oppositely disposed brackets having their lower ends engaged in a link of the conveyor chain, a spacing block disposed between the lower ends of said brackets having laterally projecting lugs at each end adapted to engage over the sides of said brackets and secure the same in parallel alinement and means securing said spacing block and brackets together.

2. A carrier trolley for conveyor chains including oppositely disposed brackets having their lower ends engaged in a link of the conveyor chain, a spacing block disposed between the lower ends of said brackets, means securing said spacing block and brackets together, a load hook disposed between the lower ends of said brackets beneath said spacing block and a free pin pivotally supporting said hook in said brackets, said pin being confined within the link of the conveyor chain engaged by said brackets.

3. A carrier trolley for conveyor chains including oppositely disposed brackets having their lower ends adapted to engage in a link of the conveyor chain, means maintaining the lower ends of said brackets in spaced relation, a pin freely mounted in vertical slots formed in the lower end of said brackets and confined therein by the link engaged with the lower ends of said brackets when in the lower ends of the slots and a load hook suspended from said pin.

4. A carrier trolley for conveyor chains including oppositely disposed brackets having their lower ends engaged in a link of the conveyor chain, the outer faces of the lower ends having transverse spaced parallel ribs forming a slot to receive the link of the chain, means maintaining the lower ends of the brackets in spaced relation, a pin freely mounted in vertical slots formed in the lower ends of said brackets, the lower ends of said vertical slots intersecting the transverse slots whereby the link holds said pin against lateral movement when in the lower ends of the vertical slots and a load hook suspended from said pin.

COLIN HERBERT McINNIS.